United States Patent [19]

Sweet

[11] Patent Number: 4,892,660
[45] Date of Patent: Jan. 9, 1990

[54] PRESSURE INDUCED SURFACTANT RECOVERY DURING ULTRAFILTRATION OF WATER-OIL EMULSIONS

[75] Inventor: James R. Sweet, Sarnia, Canada

[73] Assignee: Exxon Research and Engineering Company, Florham Park, N.J.

[21] Appl. No.: 258,344

[22] Filed: Oct. 17, 1988

[51] Int. Cl.[4] ............................................. B01D 13/00
[52] U.S. Cl. .................................... 210/637; 210/651
[58] Field of Search ......................... 210/651, 259, 637

[56] References Cited

U.S. PATENT DOCUMENTS

| | | | |
|---|---|---|---|
| 4,111,812 | 9/1978 | Baddour | 210/259 X |
| 4,293,428 | 10/1981 | Gale et al. | 252/8.55 |
| 4,426,293 | 1/1984 | Mason et al. | 210/636 |
| 4,655,927 | 4/1987 | Ford | 210/651 X |

FOREIGN PATENT DOCUMENTS 069324  1/1979  Japan .

OTHER PUBLICATIONS

"Characteristics of The Ultrafiltration of Linear Flexible-chain Polymers", Cherkasov, et al., Kolloidn Zh. 1984, 46(1) 185–6.
"Ultrafiltration", Kirk–Othmer Encyclopedia of Chemical Technology, 3rd Ed., vol. 23.

Primary Examiner—Frank Spear
Attorney, Agent, or Firm—Joseph J. Allocca

[57] ABSTRACT

Surfactants present in water/oil/surfactant emulsions can be selectively separated from the emulsions by practicing an ultrafiltration process under specific conditions of pressure and ultrafiltration membrane pore size. It has been discovered that increasing the applied pressure results in an increase in the permeability of the surfactant without a commensurate increase in the permeability of the water or oil.

4 Claims, No Drawings

PRESSURE INDUCED SURFACTANT RECOVERY DURING ULTRAFILTRATION OF WATER-OIL EMULSIONS

DESCRIPTION OF THE INVENTION

Surfactants present in water-oil-surfactant emulsions are selectively separated from the emulsion by practicing an ultrafiltration process utilizing particular pressure conditions and membranes having pore sizes within a specific range. It has been discovered that with these specific membranes, by increasing the applied pressure, the permeability of surfactant through the membrane is increased but that the pressure increase does not significantly increase the permeability of the water or oil through the membrane. The ultrafiltration process of the present invention is practiced at an applied pressure in the range 50 to 150 psi, preferably 50 to 100 psi. Ultrafiltration membranes used in the process possess molecular weight cut-offs in the range 30,000 to 500,000, preferably 50,000 to 300,000. The selectivity of the present process does not depend on the use of any additive which can contaminate the recovered surfactant. Practicing the ultrafiltration process at elevated pressure recovers substantially pure surfactant. Surprisingly, increasing the pressure does not result in an increase in the amount of oil which permeates through the ultrafiltration membrane (i.e. increasing the pressure does not reduce the selectivity).

BACKGROUND OF THE INVENTION

U.S. Pat. No. 4,111,812 teaches breaking oil/water/surfactant emulsions obtained from oil fields in which surfactants have been used in chemical flooding operations. The patent describes the use of an ultrafiltration process to break the emulsions and recover surfactants. The process is run at 1 to 10 atm. The patent states that the surfactant in the emulsion partitions between the permeated water phase and the retentate oil phase. To improve the degree of surfactant recovery the patent teaches that a co-surfactant is added to the emulsion before ultrafiltering.

U.S. Pat. No. 4,426,293 teaches that water/oil mixtures can be separated using ultrafiltration and that oil molecules can distort in shape and pass through holes smaller than the molecular size in the ultrafilter. That high pressure can force oil through a membrane which at lower pressures does not permeate oil, does not teach, suggest or imply that the selectivity of surfactant separation relative to water and oil can be controlled by proper choice of pressure and membrane pore size.

THE PRESENT INVENTION

It has been discovered that the permeability of a surfactant present in a water/oil/surfactant emulsion through an ultrafiltration membrane is increased by operating the ultrafiltration process at a pressure in the range of 50 to 150 psi, preferably 50 to 100 PSI and using an ultrafiltration membrane having a molecular weight cut-off in the range 30,000 to 500,000, preferably 50,000 to 300,000. Furthermore, it has been discovered that this increased permeability of surfactant through the membrane is achieved without the use of a co-surfactant or additive. It has also been discovered that operating over this pressure range does not increase the permeability of oil through the membrane; i.e., the amount of surfactant in the permeate increases while the amount of oil in the permeate does not increase. Productivity of the process is improved but not at the expense of selectivity.

Surfactants are present in water/oil emulsions recovered from oil production operations when used to stimulate water flooding enhanced oil recovery procedures. Such surfactants are expensive chemicals. It would be extremely useful if they could be easily and economically recovered for re-use. Further, their removal from the produced oil would simplify the further processing of the produced oil.

Surfactants used in enhanced oil recovery processes are typically anionic petroleum sulfonates, cationic quarternary ammonium compounds, nonionic surfactants such as polyoxyethylene, etc.

For recovery of surfactants from oil/water/surfactant emulsions, the ultrafiltration membrane used in the present process has a molecular weight cut-off in the range of 30 thousand to 500 thousand. The membrane should also be hydrophobic in nature. Numerous suitable membrane materials exist which satisfy these requirement, including polysulfone.

The present invention will be better understood by reference to the following non-limiting examples.

EXAMPLES

A series of 1 hour permeation test runs at ambient temperature were conducted using different feeds. One emulsion feed consisted of 5% crude oil, 1% surfactant and 94% brine. Another emulsion feed consisted of 1% crude oil, 1% surfactant and 9% brine. Yet another emulsion feed consisted of 1% oil, 5% surfactant and 94% brine. The surfactants used are the subject of U.S. Pat. No. 4,293,428. Three different ultrafiltration membranes were contacted with various of these feeds at 30° C. under a range of applied pressures. For ultrafiltration membranes of 20,000 MWCO, permeation of surfactant did not significantly increase with increased pressure. For membranes with molecular weight cut-offs of 30,000 and 500,000 it was surprisingly discovered that, in the absence of any co-surfactant, using an applied pressure of 50 to 100 psi resulted in an increase in the permeation of surfactant through the membrane without any significant increase in the amount of oil present in the permeate.

The data from these different runs are presented in Tables 1, 2 and 3.

TABLE 1

SURFACTANT PERMEATION WITH 20k MWCO CELLULOSE ACETATE MEMBRANE

|  | 1% Oil, 5% Surf. Feed | | 5% Oil, 1% Surf. Feed | |
|---|---|---|---|---|
| Pressure (psi) | Surf. % Rejection | % Oil in Perm. | Surf. % Rejection | % Oil in Perm. |
| 50 (3.4 atm) | 100 | 0 | 100 | 0 |
| 100 (7 atm) | 96.9 | 0 | 95.4 | 0 |
| 145 (10 atm) | 96.7 | 0 | 95.5 | 0 |

TABLE 2

SURFACTANT PERMEATION WITH 30k MWCO POLYSULFONE MEMBRANE

|  | 5% Oil, 5% Surf. Feed | | 5% Oil, 1% Surf. Feed | |
|---|---|---|---|---|
| Pressure (psi) | Surf. % Rejection | % Oil in Perm. | Surf. % Rejection | % Oil in Perm. |
| 25 | 86 | 0 | 64 | 0 |
| 50 | 0 | <0.1 | 12.2 | <0.1 |
| 100 | 19.5 | <0.1 | 7 | <0.1 |

TABLE 3

SURFACTANT PERMEATION WITH 500k MWCO POLYSULFONE MEMBRANE

| Pressure (psi) | 1% Surf., 1% Oil Feed | | 1% Surf., 5% Oil Feed | |
|---|---|---|---|---|
| | Surf. % Rejection | % Oil in Perm. | Surf. % Rejection | % Oil in Perm. |
| 25 | 42 | <0.1 | 93 | <0.1 |
| 50 | 17.5 | <0.1 | 63 | <0.1 |
| 100 | 19 | <0.1 | 23 | <0.1 |

What is claimed is:

1. A method for recovering surfactant from an oil/water/surfactant emulsion, the method consisting of contacting the emulsion with an ultrafiltration membrane having a molecular weight cut-off in the range 30,000 to 500,000 at a pressure in the range 50 to 150 psi thereby selectively permeating the surfactant through the membrane.

2. The method of claim 1 wherein the pressure is in the range 50 to 100 psi.

3. The method of claim 1 wherein the ultrafiltration membrane has a molecular weight cut of in the range 50,000 to 300,000.

4. The method of claim 1 or 3 wherein the ultrafiltration membrane is polysulfone.

* * * * *